US005161373A

United States Patent [19]

Morikawa et al.

[11] Patent Number: 5,161,373

[45] Date of Patent: Nov. 10, 1992

[54] HYDRAULIC CONTROL VALVE SYSTEM

[75] Inventors: Rindo Morikawa, Saitama; Yusuke Kajita; Genroku Sugiyama, both of Ibaraki, all of Japan

[73] Assignees: Zexel Corporation; Hitachi Construction Machinery Co., Ltd., both of Tokyo, Japan

[21] Appl. No.: 717,532

[22] Filed: Jun. 19, 1991

[30] Foreign Application Priority Data

Jun. 22, 1990 [JP] Japan .................................. 2-162772

[51] Int. Cl.[5] ................................................ F16D 31/02

[52] U.S. Cl. ......................................... 60/484; 91/446; 91/532

[58] Field of Search ......................... 60/422, 462, 484; 91/514, 518, 532, 446, 447, 468

[56] References Cited

U.S. PATENT DOCUMENTS 3,126,795 3/1964 Kesselring ............................ 91/446
4,129,987 12/1978 Blume .................................. 60/452
4,192,346 3/1980 Iizumi .................................. 91/447
5,025,625 6/1991 Morikawa ............................ 91/518
5,056,312 10/1991 Harita et al. ......................... 60/427

FOREIGN PATENT DOCUMENTS 11706 1/1985 Japan .
150201 10/1989 Japan .
134402 5/1990 Japan .

*Primary Examiner*—Edward K. Look
*Assistant Examiner*—F. Daniel Lopez
*Attorney, Agent, or Firm*—Nields & Lemack

[57] ABSTRACT

Disclosed is a hydraulic control valve system, for driving a plurality of hydraulic actuators by a single pump, including pressure compensation valves and a shuttle valve disposed in a vertical bore orthogonal to a lateral bore of a valve body, into which a spool of a direction switching valve is fitted. A load sensing chamber for introducing a load pressure of an actuator is formed at an intersection between the lateral bore and the vertical bore. An opening-side first pressure receiving surface of the pressure compensation valve confronts the load sensing chamber. The pressure compensation valve has an opening-side second pressure receiving surface contacting a pilot pressure in the vicinity of the opening-side first pressure receiving surface. Formed on the upper side of the pressure compensation valve are a closing-side first pressure receiving surface on which a bridge pressure acts and a closing-side first pressure receiving surface on which an external control pressure acts. The pressure compensation valve incorporates a throttle check valve working as a resistance at a descending time upon receiving a closing-side pressure in a region of the opening-side first pressure receiving surface.

11 Claims, 7 Drawing Sheets

HYDRAULIC CONTROL VALVE SYSTEM

BACKGROUND OF THE INVENTION

1. Field of the Invention

The present invention relates to a hydraulic control valve system suitable for a system for driving a plurality of hydraulic actuators by one pump.

2. Description of the Prior Art

A construction machine involves the use of a large capacity hydraulic pump. A plurality of actuators are driven with a discharge oil from this hydraulic pump. For instance, in a power shovel, the single large capacity hydraulic pump drives a turning hydraulic motor, a left traveling motor, a right traveling motor, a boom cylinder, an arm cylinder and a bucket cylinder.

In this hydraulic system, direction switching valves are connected between the signal hydraulic pump and the respective actuators. It is a common practice that a quantity of oil sent to the actuator is compensated by a pressure compensation valve to restrain variations in operating velocity of the actuator due to fluctuations in load. In the prior art, however, a control pressure of the pressure compensation valve is set depending on a spring property of a spring. For this reason, there arise such problems that a control pressure difference is sufficiently secured with difficulty due to a lack of pump discharge quantity or a difference in load pressure; and the operating velocities of the plurality of actuators are easily brought into an ill-balanced state.

Proposed as a counter measure for the problems in Japanese Patent Application Laid-Open Publication No. 11706/1985 was such an arrangement that the throttle opening of the pressure compensation valve is controlled not by a spring force but by a pressure difference between a pump discharge pressure and a signal pressure from a shuttle valve. More specifically, according to this prior art, the pressure compensation valve is provided on the upstream side of the direction switching valve. A load of a pressure (bridge pressure) reaching the direction switching valve is applied on the closing side of pressure compensation valve. A load pressure of the actuator is applied on the opening side thereof. Separately from this set of opening/closing pressures, the maximum load pressure (selected by the shuttle valve) of the actuator which is on the operation is applied on the closing side of the pressure compensation valve. A load of a pump discharge pressure is put on the opening side thereof.

This prior art (hereinafter referred to as the prior art 1), however, presents only hydraulic circuitry. As a concrete system, there was expected to the utmost such a mode that the pressure compensation valves each having an independent structure, the shuttle valve and the direction switching valve are connected to each other through external pipes. For this reason, the system becomes complicated and increases in size.

Thereafter, Japanese Utility Model Laid-Open Publication 150201/1989 (hereinafter referred to as the prior art 2) was proposed. This prior art 2 is an embodied version of the prior art 1. The prior art 2 is superior in terms of the arrangement that one valve body skillfully incorporates the direction switching valve, the pressure compensation valves and the shuttle valve. The prior art 2 is still, however, accompanied with a problem in which load pressure introducing passages to the pressure compensation valves and the shuttle valve are intricate, and manufacturing/assembling operations are therefore troublesome. Whether in the prior art 1 or in the prior art 2, the actuator load pressure (opening-side pressure) confronts the pressure (closing-side pressure) on the upstream side of the notch of the direction switching valve. On the other hand, the pump discharge pressure (opening-side pressure) confronts directly the maximum load pressure (closing-side pressure) selected by the shuttle valve. The throttle opening is controlled based on a pressure difference therebetween. As a result, a degree of freedom to control the throttle opening of the pressure compensation valve is poor. It is difficult to individually match with requirements of various operating conditions for every actuator.

The following was proposed as a countermeasure for this in Japanese Patent Application Laid-Open Publication No. 134402/1990. Based on this prior art (hereinafter referred to as the prior art 3), the passages for connecting the above-mentioned three types of valves to each other are composed of single internal passages. The advantages thereof are such that the whole valve unit can be made compact, and the multi-valve unit is easily attainable. As a closing-side pressure element of the pressure compensation valve, the maximum load pressure selected by the shuttle valve is not directly employed. Alternatively used is the external control pressure set corresponding to a differential pressure between the maximum load pressure selected by the shuttle valve and the pump discharge pressure. Hence, there are obtained merits in which the degree of freedom for pressure compensation control is high, and a good controllability of the pressure compensation is obtained even when the maximum load pressure fluctuates.

In the prior art 3, however, if the external control pressure which controls the maximum load pressure of the actuator biases a balance piston of the pressure compensation valve to the closing side, the balance piston abruptly drops down. In contrast with this, an opening-side chamber of the balance piston undergoes directly the fluctuations in load pressure of the actuator. This causes such problems that when a minute flow rate is controlled by the pressure compensation valve—i.e., when the throttle opening of the pressure compensation valve is minute, a hunting phenomenon takes place; and the flow rate can not be controlled well.

SUMMARY OF THE INVENTION

It is a primary object of the present invention, which obviates the problems inherent in the above-described prior art 3, to provide a hydraulic control valve system capable of stably controlling a minute throttle opening without causing hunting in pressure compensation valve with respect to a light-load-side actuator even in such a simultaneous operation that a plurality of actuators are driven simultaneously, and a certain actuator is moved slowly while moving other actuators at a high speed.

It is another object of the present invention to provide a hydraulic control valve system having a simple, compact and easy-to-assemble hunting preventive mechanism for the pressure compensation valves.

To accomplish the objects given above, the present invention fundamentally has the following constructions.

The control valve system is disposed between a single hydraulic pump and a plurality of actuators driven by this pump. This control valve system includes a plurality of control valves set into valve bodies each incorporating a shuttle valve for transmitting a signal pressure by selecting a higher pressure from load pressures of the actuators and pressure compensation valves each having a function to shunt a discharge oil of a main pump in addition to a direction switching valve.

The control valve system further includes an unload relief valve working on the closing side by a maximum load pressure detected by the shuttle valve, a pilot pump for supplying a pilot pressure to the pressure compensation valve, a detector for detecting a differential pressure between the maximum load pressure detected by the shuttle valve and the main pump discharge pressure, an electromagnetic proportional pressure control valve for producing an external control pressure acting on the closing side of the pressure compensation valve and a control unit for operating the electromagnetic proportional pressure control valve in accordance with a magnitude of the differential pressure detected by the detector.

The valve body is formed with a lateral bore in which a spool of the direction switching valve is slid and a vertical bore orthogonal thereto. The pressure compensation valve is accommodated in an upper vertical sub-bore, while the shuttle valve is accommodated in a lower vertical sub-bore.

A load sensing chamber into which the load pressure of the actuator is introduced is provided at an intersection between the vertical bore and the lateral bore. An opening-side first pressure receiving surface of the pressure compensation valve faces to the load sensing chamber. Besides, the pressure compensation valve has an opening-side second pressure receiving surface on which the pilot pressure from the pilot pump acts in the vicinity of the opening-side first pressure receiving surface. A closing-side first pressure receiving surface on which a bridge pressure acts is formed on the upper part of the pressure compensation valve. Formed at the top part thereof is a closing-side second pressure receiving surface on which an external control pressure from the electromagnetic proportional pressure control valve acts.

The present invention is, in addition to such a fundamental construction, characterized by incorporating a throttle check valve working as a descent resistance when undergoing the closing-side pressure in a region of the opening-side first pressure receiving surface of the pressure compensation valve.

The throttle check valve assuming a cup-like configuration has a cylindrical portion loosely fitted into an interior of a cylindrical bore conceived as the closing-side first pressure receiving surface, a seal wall serving as a bottom of the cylindrical portion and a protruded portion extending from this seat wall to the load sensing chamber. The seat wall is pressed by a spring supported on the bottom of the cylindrical bore. The seat wall is seated with an impingement wall for sectioning the cylindrical bore from the load sensing chamber. The protruded portion has a contraction hole through which the load sensing chamber communicates with an interior of the cylindrical portion.

According to the present invention, even if the balance piston of the pressure compensation valve is moved on the closing side by the external control pressure (which controls the maximum load pressure of the actuator), a pressure oil flowing into the cylindrical portion from the load sensing chamber and thrusting the balance piston on the opening side then runs into the load sensing chamber while being flow-rate-controlled by throttle action of the throttle check valve. As a result, the pressure oil within the cylindrical portion works as a cushion. For this reason, the balance piston does not descend abruptly and is thereby settled down in a predetermined balance positioned at an appropriate velocity, thus performing soft landing on the wall. Hence, no hunting in the pressure compensation valve takes place. Besides, the minute flow rate is properly controllable. That balance position, as a matter of course, includes both a contact-position with the impingement wall and the non-contact position therewith.

The pressure compensation valve and the shuttle valve are accommodated in the vertical bore intersecting the lateral bore for accommodating the spool of the direction switching valve. A part of the pressure compensation valve incorporates the throttle check valve, whereby a compact structure can be kept. In addition, the protruded portion of the throttle check valve intrudes into the load sensing chamber, thereby facilitating both the positioning process and the assembly with the pressure compensation valves.

Additionally, the present invention exhibits the following effects.

As a mechanism for introducing the load pressures of the actuators to the pressure compensation valves and the shuttle valve, the load sensing chamber is formed at the intersection between the lateral bore and the vertical bore. The shuttle valve and the throttle check valve confront this load sensing chamber, whereby the configurations of the passages can be simplified.

The maximum load pressure of the actuator is not allowed to work directly as a closing-side pressure of the pressure compensation valve. Instead, the detector, the electromagnetic proportional pressure control valve and the control unit cooperate to produce the external control pressure corresponding to a differential pressure between the maximum load pressure of the actuator and the pump discharge pressure. This external control pressure works as the closing-side pressure of the pressure compensation valve. Therefore, when simultaneously driving the plurality of actuators, a total oil quantity is regulated corresponding to a magnitude of the maximum load pressure. A lack of the pump discharge oil is thereby relieved. Hence, both the light-load actuator and the heavy-load actuator can be so controlled as to work in a well-balanced state.

Other constructions and advantages of the present invention will become apparent during the following detailed discussion taken in conjunction with the accompanying drawings. So far as the basic characteristics of the invention are provided, the present invention is not, however, limited to the constructions shown in the embodiments.

DETAILED DESCRIPTION OF THE PREFERRED EMBODIMENTS

Embodiments of the present invention will hereinafter be described with reference to the accompanying drawings.

Figure 1:
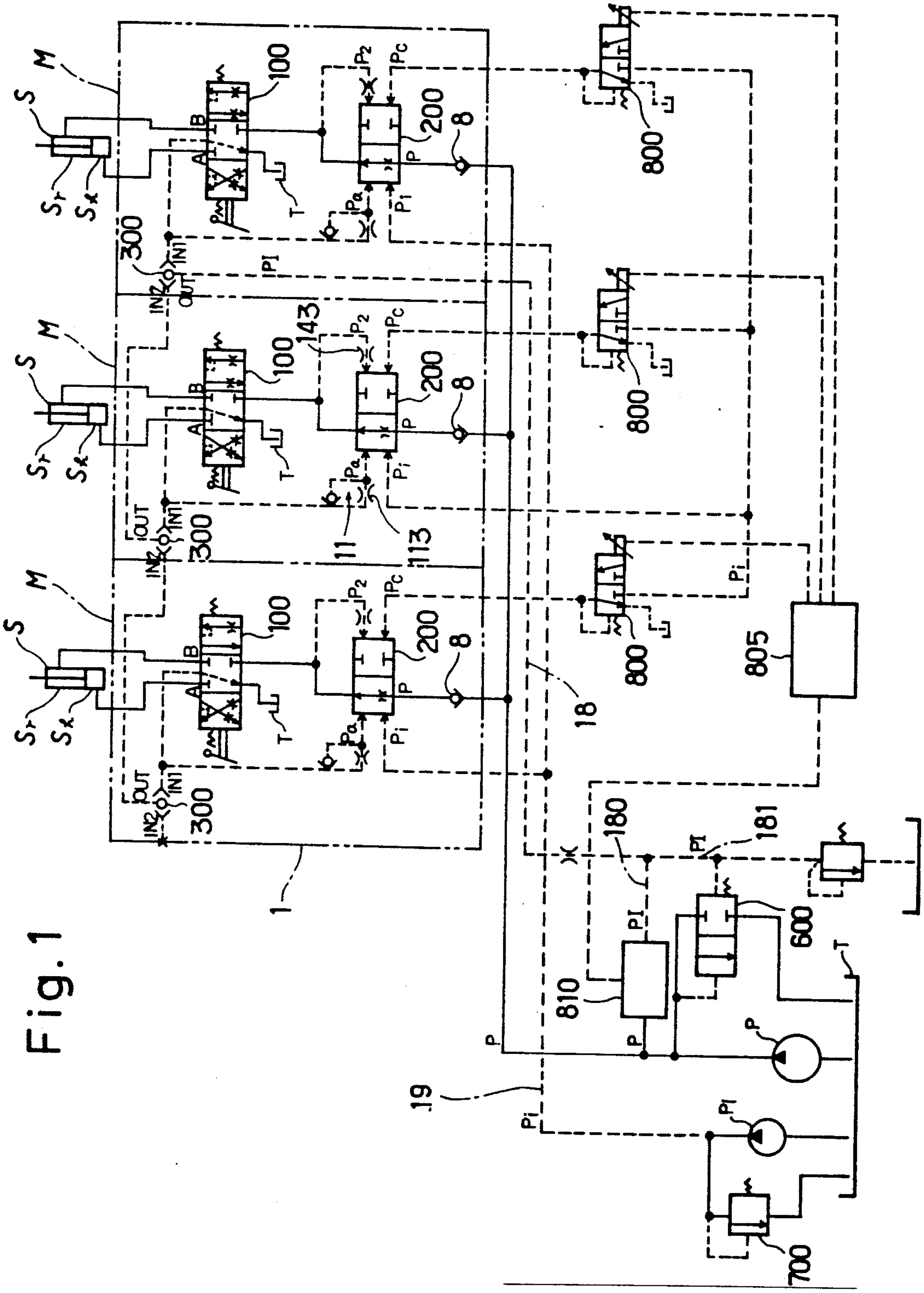
FIG. 1 is a circuit diagram illustrating a hydraulic control valve system of the present invention.
Figure 2:
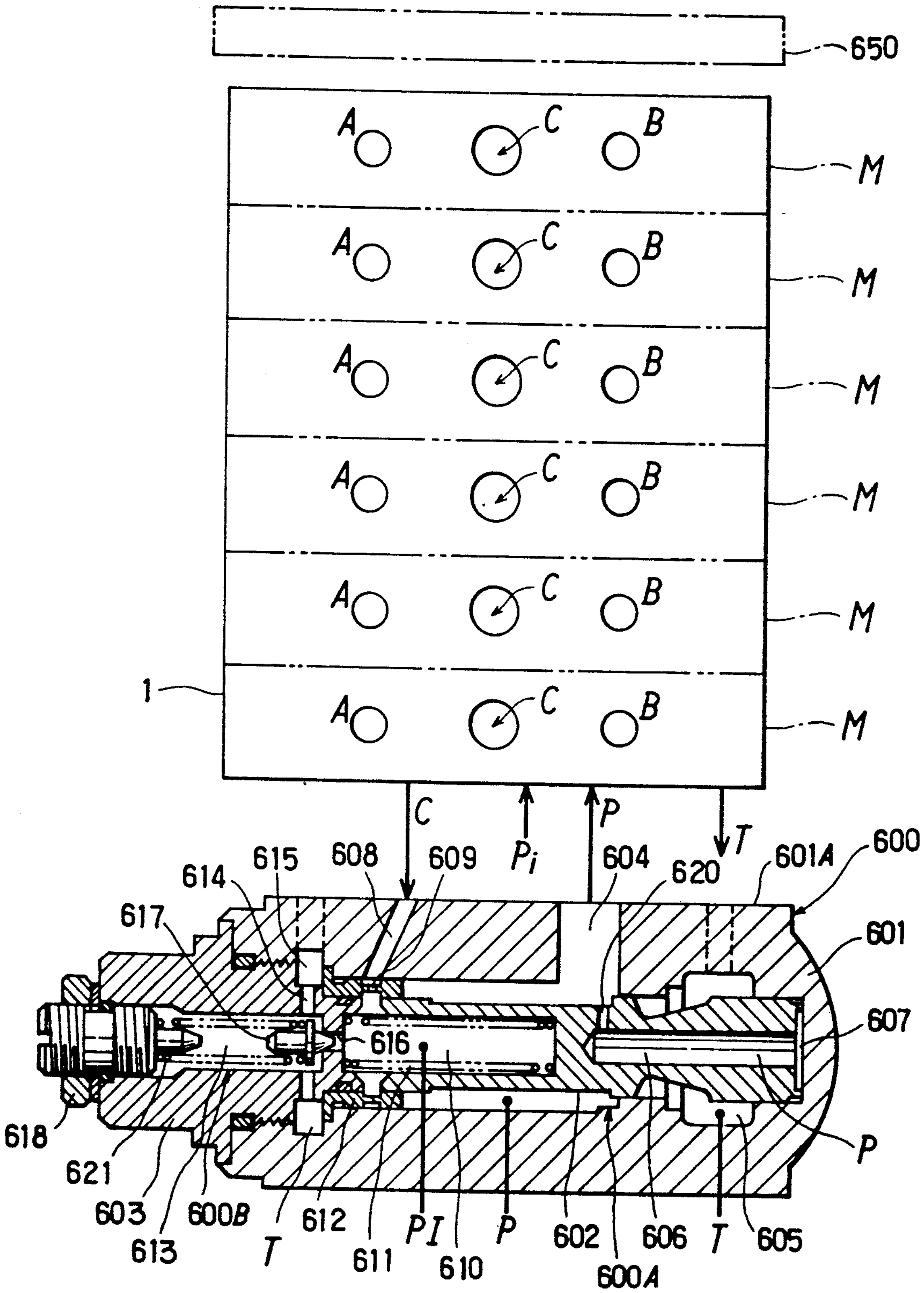
FIG. 2 is a diagram of assistance in explaining a relation between a control valve and an unload relief valve in the hydraulic control valve system of this invention.

FIG. 1 is a diagram illustrating circuitry of a hydraulic control valve system according to this invention. FIG. 2 is a view depicting an outline of a control valve.

A whole construction of the hydraulic control valve system of this invention will be explained. Incorporated therein are a single main pump P, a plurality of control valves M connectively interposed between a plurality of actuators S, a pilot pump Pi driven singly or coaxially with the main pump P and an unload relief valve 600 connected to a discharge passage of the main pump P disposed more upstream than the control valve M.

Each of the control valves M has a valve body 1 incorporating a direction switching valve 100 for each actuator, a pressure compensation valve 200, having a flow dividing function, for controlling a quantity of oil running through a supply port of the direction switching valve 100 and a shuttle valve 300 for selecting the maximum load pressure from load pressures acting on the respective actuators.

The hydraulic control valve system further includes a plurality of electromagnetic proportional pressure control valves 800 for generating outside control pressures for the respective pressure compensation valves 200, a differential pressure detector 810 connected to the discharge passage disposed more downstream than the unload relief valve 600 and a control unit 805 for controlling the operation of the electromagnetic proportional pressure control valve 800 by signals transmitted from the differential pressure detector 810.

Individual components will next be described. The description will start with touching on the control valves M. The plurality of control valves M are provided in the one-block valve bodies 1 in this embodiment. The unload relief valve 600 and an end plate 650 are, as illustrated in FIG. 2, set on both sides of this valve body 1, and these components are made integral with each other through tie rod or the like. The control valve M may take, as a matter of course, such a mode that each independent body incorporates the direction switching valve 100, the pressure compensating valve 200 and the shuttle valve 300, and the respective bodies are stacked.

Figure 3:
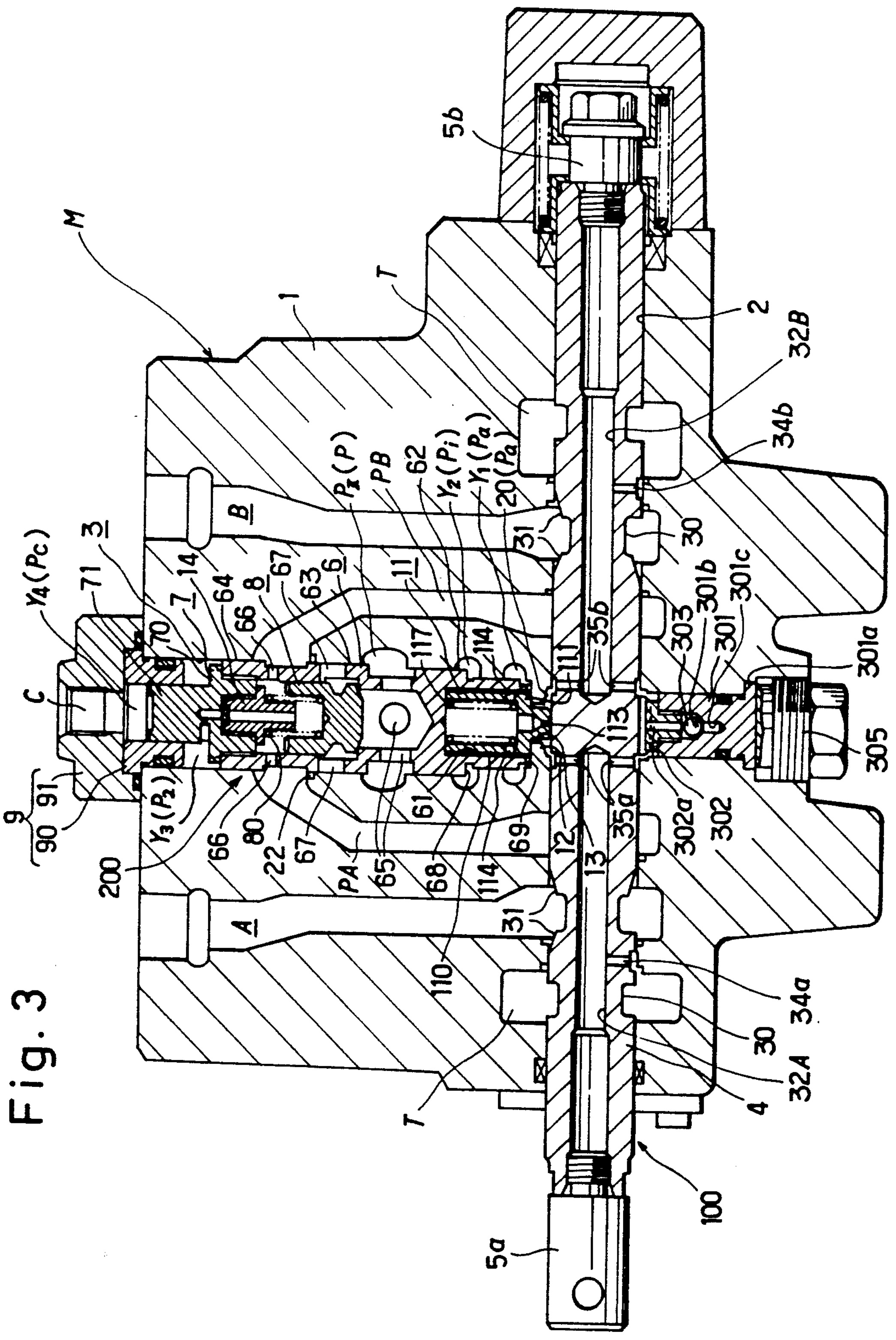
FIG. 3 is a sectional view showing an embodiment of the control valve according to this invention.

FIGS. 3 through 7 fully depict the control valve M. Bored in the valve body 1 are a lateral bore 2 and a vertical bore 3 orthogonal to the bore 2. A spool 4 of the direction switching valve 100 is slidably inserted into the lateral bore 2. On the other hand, the vertical bore 3 accommodates the pressure compensation valve 200 attached to a portion higher than the spool 4 and the shuttle valve 300 attached to a portion lower than the spool 4. Both ends of the spool 4 protrude from the valve body 1. One side end of the spool 4 is retained by a return spring mechanism, whereby the spool is held in a neutral position as shown in FIG. 3.

Formed in a spool bore at the intersection between the lateral bore 2 and the vertical bore 3 is a load sensing chamber 20 for introducing a load pressure of the actuator S. Bridge-like supply ports PA, PB, actuator ports A, B and tank ports T, T are disposed to exhibit a bilateral symmetry with respect to this load sensing chamber 20. Upper ends of the supply ports PA, PB communicate with the vertical bore 3.

The spool 4 has switching relations wherein the whole ports PA, PB, A, B, T, T which are all blocked in the neutral position are, when the spool 4 moves right, switched such as PA→A, B→T, and are, when the spool 4 moves left, further switched such as PB→B, A→T.

Shaped on the outer periphery of the spool 4 are reduced diameter portions 30, 30 each having a choke 31 in positions corresponding to the actuator ports A, B. Two communicating passages 32A, 32B are provided in the axial direction. These communicating passages 32A, 32B serve to lead the load pressures of the actuators S into the load sensing chamber 20. The front ends of the communicating passages 32A, 32B are blocked at the spool central part (corresponding to the load sensing chamber). The rear ends of the communicating passages 32A, 32B are shut by plugs 5*a*, 5*b*. Besides, those communicating passages 32A, 32B have small divergent holes 34*a*, 34*b* communicating with the spool outer peripheral surface in the vicinity of the reduced diameter portions 30, 30. The same passages also have small divergent holes 35*a*, 35*b* communicating with the spool outer peripheral surface in a region of the load sensing chamber.

Those small holes 34*a*, 35*a*, 34*b*, 35*b* permit the load sensing chamber 20 to communicate with the right and left tank ports T, T when the spool 4 is in the neutral position. The same holes, when the spool 4 moves, introduce the load pressures into the load sensing chamber 20 via the actuator port A or B to be supplied with a pressure oil. More specifically, when the spool 4 moves right, the left side small-holes 34*a*, 35*b* permit the communication between the load sensing chamber 20 and the actuator port A, whereas the right side small holes 34*b*, 35*b* cut off the communication between the load sensing chamber 20 and the actuator port B. When the spool 4 moves left, reversely the load sensing chamber 20 is permitted to communicate with the actuator port B, while the communication between the chamber 20 and the port A is cut off.

Figure 5:
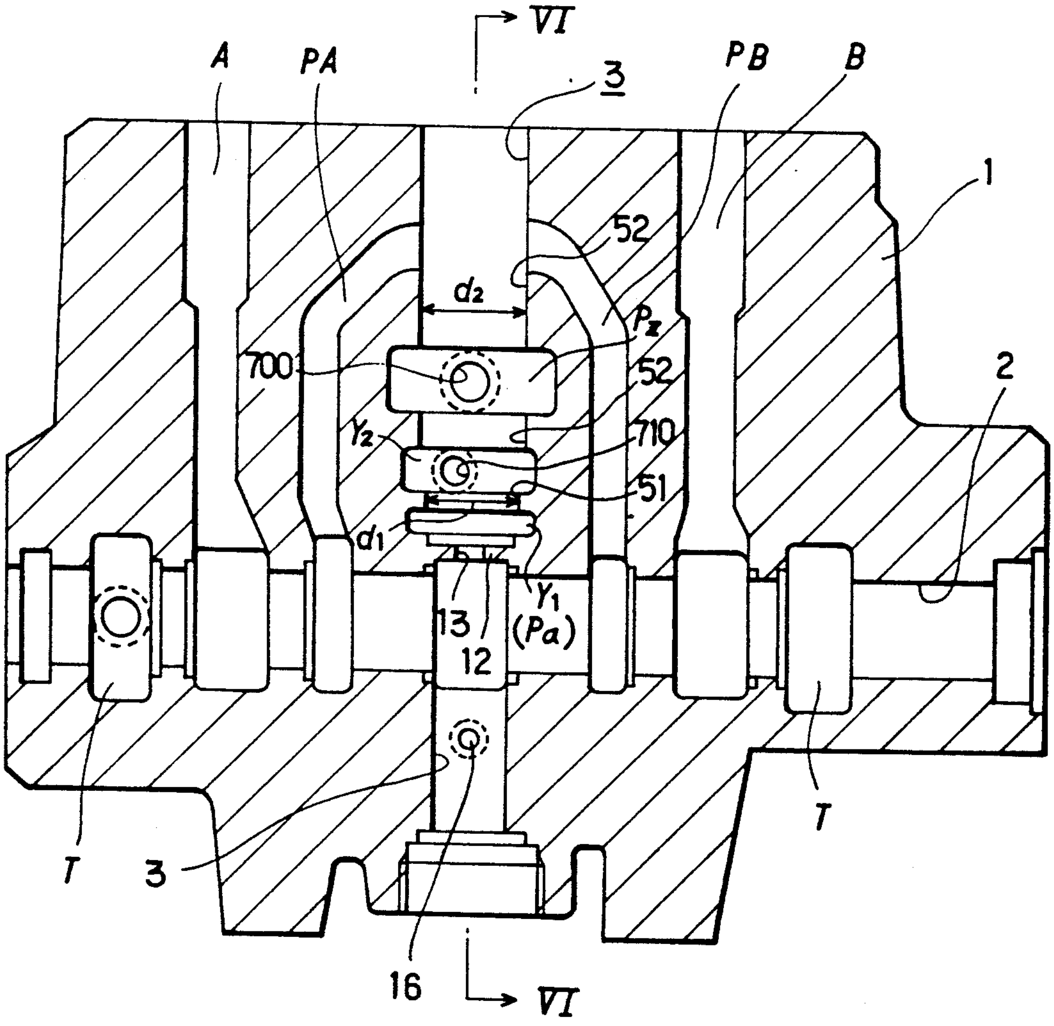
FIG. 5 is a sectional view depicting a valve body of the control valve.
Figure 6:
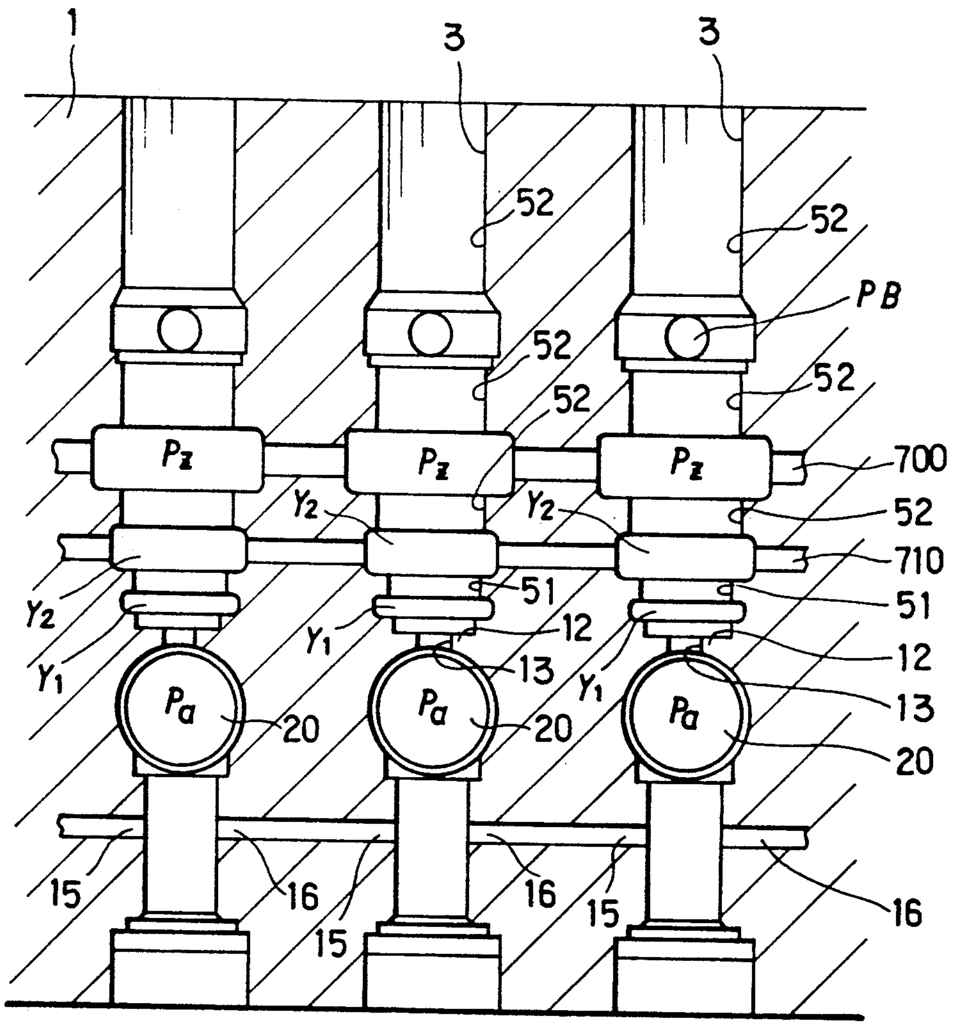
FIG. 6 is a sectional view taken substantially along the line VI—VI of FIG. 5.

The upper vertical sub-bore of the above-mentioned vertical bore 3, as illustrated in FIGS. 5 and 6, extends from the upper surface of the valve body 1 to an impingement wall 12. The impingement wall 12 assuming an inter-flange-like configuration communicates via a central through-hole 13 with the load sensing chamber 20. The upper vertical sub-bore is a small-diameter bore 51 having a diameter d1 with a desired height from the impingement wall 12. Formed is a large-diameter bore 52 higher than this small-diameter bore 51 and having a diameter d2. A first oil chamber Y1 for leading a load pressure Pa from the load sensing chamber 20 is annularly formed in a region of the small-diameter bore 51. In contrast with this, a second oil chamber Y2 for leading a pilot pump pressure is also annularly formed in a boundary region between the small-diameter bore 51 and the large-diameter bore 52. Furthermore, a pump pressure chamber Pz for introducing a pump pressure is annularly shaped in the vertical bore part between the second oil chamber Y2 and a connecting portion between the supply ports PA and PB.

As depicted in FIGS. 5 and 6, the second oil chambers Y2 of the respective control valves are connected to each other through a common passage 700 penetrating the valve body 1. The pump pressure chambers Pz of the respective control valves are also connected to each other through a common passage 710 penetrating the valve body 1. The common passage 700 is connected to the pilot pump Pi through an external pipe. The common passage 710 is connected to the main pump P through an external pipe.

Figure 4:
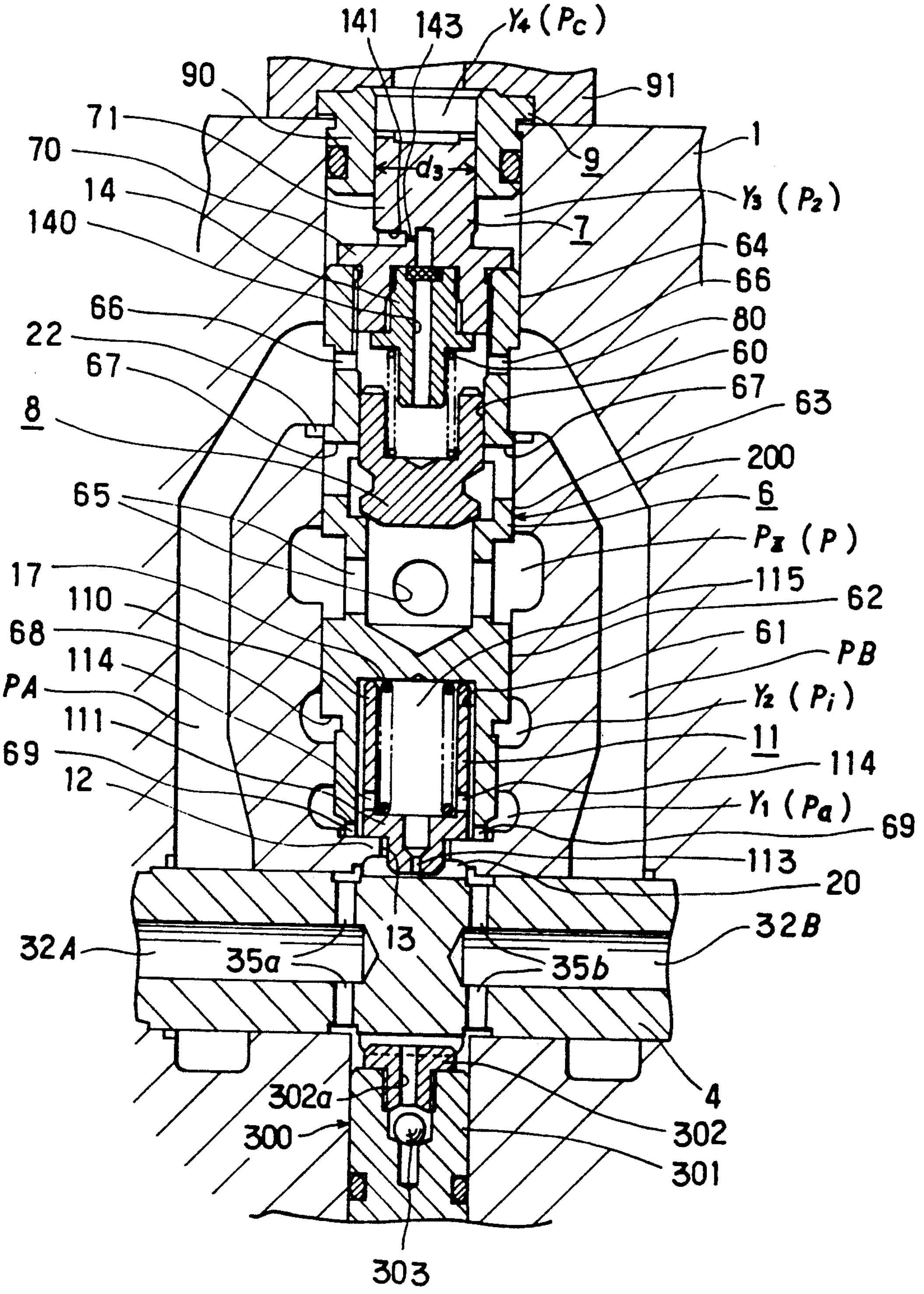
FIG. 4 is a partially enlarged view thereof.

The pressure compensating valve 200 is illustrated in FIGS. 3 and 4. This pressure compensation valve 200 includes a balance piston 6 slidably disposed in the vertical bore 3, a plug 7 fixed to the upper portion of the balance piston 6, a load check valve 8 incorporated in the intermediate portion of the balance piston 6, a throttle check valve 11 incorporated into the lower portion of the balance piston 6 and a cap assembly 9 for blockading an opening of the vertical bore.

Now, the balance piston assumes a cylindrical shape. To be more specific, the balance piston 6 has an upper bore 60 extending from the upper end thereof to a portion corresponding to the pump pressure chamber Pz and a cylindrical bore 61 (lower bore) extending from the lower end thereof so that a partition wall remains between the upper bore 60 and the bore 61 itself. An internal thread is formed in an opening of the upper bore 60. A screw member of the plug 7 is screwed into this opening, whereby the plug 7 becomes integral with the balance piston 6. The cylindrical bore 61 shapes a first pressure receiving surface on the side of an opening of the pressure compensation valve 200. The first pressure receiving surface assumes the cylindrical configuration and has its bottom (ceiling) that is flat. A lower annular end surface impinges on the above-mentioned impingement wall 12, whereby a lower limit of the balance piston 6 is regulated.

The balance piston 6 has a small-diameter portion having a diameter d1, this portion corresponding to the above-described small diameter bore 51. This small-diameter portion is terminated substantially in the middle of the second oil chamber Y2. In continuation from a stepped portion 68 conceived as a second pressure receiving surface on the opening side, 3-stage land portions 62, 63, 64 each having a diameter identical with that of the large-diameter bore 52.

The lower land portion 62 contacts a large-diameter bore between the second oil chamber Y2 and the pump chamber Pz. The middle land portion 63 contacts a large-diameter bore between the pump pressure chamber Pz and the supply port connecting portion. The upper land portion 64 contacts a large-diameter disposed more upstream than the supply port connecting portion. The rod member between the middle land portion 63 and the lower land portion 62 confronts the pump pressure chamber Pz. Formed in this portion are a plurality of through holes 65 for introducing inwards a main pump pressure P. The rod member between the upper land portion 62 and the middle land portion 63 faces of the supply ports PA, PB. Bored in this portion are plurality of small bores 66 for introducing a pressure (hereinafter referred to as a bridge pressure) Pz of the supply ports PA, PB. The load check valve 8 is slidably inset in the upper bore 60 positioned more upstream than the through0hole 65. The load check valve 8 is of a poppet type and is seated by a valve seat member assuming an inter-flange shape with the aid of a spring 80 exhibiting a weak spring force which is retained by a plug 14 for a spring seat. The spring seat plug 14 is fixedly screwed into the plug 7.

The middle land portion 63 in the vicinity to the seat member of the load check valve 8 includes, as illustrated in FIG. 4, a plurality of support holes 67, formed in radial direction, for leading the pump pressure oil to the supply ports PA, PB. Formed in a vertical bore portion corresponding to the connecting portion of the supply ports PA and PB is a contraction annular groove (notch) 22 having a depth enough to exhibit excessive overlapping with the middle land portion 63. This contraction annular groove 22 serves to lead, when the balance piston shifts upwards, the oil via the supply hole 76 to the supply ports PA, PB in accordance with a displacement quantity thereof.

The plug 7 has an intermediate flange 70 brought into close contact with the upper end surface of the balance piston 6. The intermediate flange 70 integrally includes a head 71 having a diameter d3 smaller than that of the small-diameter bore 51 shown in FIG. 5. This head 71 extends upwards and is slidably inserted into an interior of a boss 90 fitted in the vertical bore 3. With this arrangement, there is formed a third annular oil chamber Y3 defined by the lower end of the boss 90, the intermediate flange 70 and the vertical bore. Besides, the intermediate flange 70 functions as a first pressure receiving surface on the closing side.

The foregoing boss 90 is sealed by an O-ring with respect to the vertical bore and at the same time retained by a connector 91 formed with a port C for introducing an external control pressure. With this arrangement, there is formed a fourth oil chamber Y4 defined by the connector 91, the boss inner surface and the head end surface. Furthermore, the upper end surface of the head 71 functions as a second pressure receiving surface on the closing side. The connector 91 is fixed to the valve body 1 by an appropriate method.

A back pressure chamber 81 (accommodating the spring 80) of the load check valve 8 communicates via the small bore 66 with the supply ports PA, PB, thereby introducing the bridge pressure Pz. The back pressure chamber 81 communicates with the third oil chamber Y3 via an axial bore 140 penetrating the spring seat plug 14 and reaching the head 71 and further a lateral hole 141 extending from the axial bore 140 in the radial direction. A filter 142 is so attached to the spring seat plug 14 as to intersect the axial bore 140. A contraction hole 143 is formed in a part of the lateral hole 141, and it follows that the bridge pressure Pz is contracted in terms of its flow rate and then led into the third oil chamber Y3.

A throttle check valve 11 assumes, a depicted in FIG. 4, a cup-like shape on the whole. The throttle check valve 11 is fitted into the cylindrical bore 61 of the balance piston 6. More specifically, the throttle check valve 11 includes a cylindrical portion 110 having an outside diameter enough to provide an appropriate gap between the cylindrical bore 61 and this cylindrical portion itself and a seal wall 111 serving as a bottom of the cylindrical portion. Formed integrally with the seal wall 111 is a protruded member 112 having an outside diameter enough to provide an appropriate gap between the through-hole 13 of the impingement wall 12 and the protruded member 112 itself. The protruded member 112 passes through the through-hole 13 and extends to the load sensing chamber 20.

The throttle check valve 11 is biased downwards by a spring 17 interposed between the seal wall 111 and the cylindrical bore bottom. With this arrangement, the lower surface of the seat wall 111 impinges on the wall 12 and is thus brought into close contact therewith. The protruded member 112 is formed with a contraction hole 113 through which the load sensing chamber 20 communicates with a cylindrical portion internal chamber 115. Bored in the root of the cylindrical portion 110 are a plurality of through-holes 114 through which the cylindrical portion internal chamber 115 communicates with the cylindrical bore 61. Besides, a plurality of notches 69 through which the cylindrical bore 61 communicates with the first oil chamber Y1 are formed in the annular lower end portion of the balance piston 6.

Figure 7:
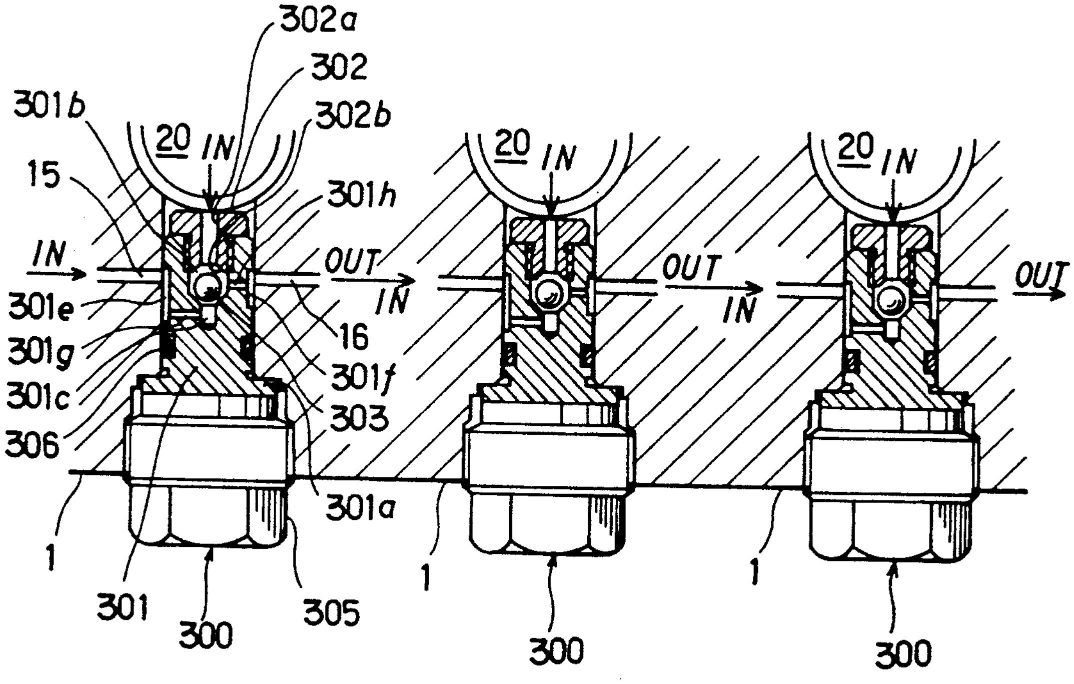
FIG. 7 is a sectional view showing a mutual connecting relation of shuttle valves.

Next, the shuttle valve 300 will be explained. The shuttle valve 300 is depicted in FIGS. 3 and 7. The shuttle valve 300 includes: a holder 301 oiltightly inserted into the lower vertical sub-bore while being positioned by a flange 301 assuming a non-circular or eccentric configuration; a cap 302 screwed into the top end of the holder 301; a ball valve 303 accommodated in a valve accommodating bore 301 formed between the cap 302 and the holder 301; and a plug 305 for fixing the holder 301.

The ball valve 303 is approachable to and separable from seat portions formed respectively at a top end 302*b* of the cap 302 and the innermost part of the valve accommodating bore 301*b*. The cap 302 is formed with a first inlet hole 302*a*. The load pressure of the actuator S to which the control valve concerned belongs is introduced from the load sensing chamber 20 via this first inlet hole 302*a* into the valve accommodating bore 301*b*.

On the other hand, as illustrated in FIG. 7, recesses 301*e*, 301*f* are so formed in the outer periphery of the holder 301 as to exhibit displacement through 180°. One recess 301*e* communicates via a communicating hole 301*g* with a drill bore 301*c* formed in the bottom of the valve accommodating bore 301*b*. A second inlet hole is thus configured. The other recess 301*f* communicates via a communicating hole 301*h* with the valve accommodating bore 301*b*, thus configuring an outlet hole. The valve body 1 is formed with passages 15, 16 communicating with the recesses 301*e*, 301*f*, respectively. The passages 15, 16 are orthogonal to the vertical bore.

The load pressure of the actuator concerned is introduced via the first inlet hole 302*a* into the valve accommodating bore 301*b* of the shuttle valve 300. The load pressure of the adjacent actuator is led thereinto via the passage 15 as well as via the second inlet hole. If the load pressure at the second inlet hole is high, the ball valve 303 shuts the cap seat. Whereas if the load pressure at the first inlet hole 302*a* is high, the ball valve 303 shuts the valve accommodating bore seat. The load pressures reach the next shuttle valve through the communicating hole 301*h* and the passage 16 as well. The similar selection is effected therein. Among those load pressure, the maximum load pressure PI is taken out of the last shuttle valve. The maximum load pressure PI is, as illustrated in FIG. 1, led from the valve body of the rightmost control valve M to the passage 18. The maximum load pressure Pi is then transferred to the differential pressure detector 810 and the unload relief valve 600 through branch passages 180, 181.

The unload relief valve 600 is depicted in FIG. 2. This unload relief valve 600 has an unload valve 600*a* disposed in a right region of the body 601 and a relief valve 600B disposed in a left region thereof. The unload valve is, as a matter of course, intended to release the pressure oil discharged from the main pump P at a low pressure when the direction switching valve is not manipulated. The relief valve 600B is intended to escape from the main pump to a full-flow tank when reaching the set pressure.

To be specific, the body 601 is formed with a pump passage 604 and tank passages 605, 615 provided on both sides thereof. One ends of the pump passage 604 and the tank passage 605 are opened to a fitting surface to the control valve, while the other ends thereof are opened to a tank port and a pump port of an unillustrated concentrated piping surface.

A bush 612 is fixedly inserted into a valve bore orthogonal to the pump passage 604 and the tank passage 605. The tip of the plug 603 screwed from the opening side of the body 601 is inserted into an interior of the bush 612. An unload valve disc 602 is slidably inserted into the innermost part of the valve bore, with the bush 612 serving as a guide.

The unload valve disc 602 has two coaxial blind holes 606, 610 bored from both ends. A spring 611 is interposed between the bottom of the left blind hole 610 and the tip of the plug 603. The unload valve disc 602 is constantly biased rightwards by this spring 611. A load pressure chamber (back pressure chamber) is thus formed. The blind hole 610 will hereinafter be referred as a load pressure chamber. The intermediate portion of the unload valve disc 602 is bored with a passage bore 620 through which the pump passage 604 communicates with the right blind hole 606. A pressure receiving chamber (pilot chamber) 607 is formed at the opening end of the blind hole 606.

On the other hand, the plug 603 is formed with a spring chamber 613. Formed on the top end side thereof is a passage bore 614 constantly communicating with the tank passage 615. Bored in the axial line of the spring chamber 613 is a passage bore 616 for permitting a communication between the load pressure chamber 610 and the tank passage 615. The spring chamber 613 incorporates a pilot type relief valve disc 617 for opening and closing the passage bore 616. The relief valve disc 617 is constantly biased on the closing side by the spring 621 retained by an adjusting screw 618. The bush 612 has a choke 609 communicates with the load pressure chamber 610. This choke 609 communicates with a signal passage 608 bored in the fitting surface of the body 601.

As discussed above, the fitting surfaces of the unload relief valve 600 and the control valve M are closely fitted to each other. In this state, the pump passage 604 communicates with the pump pressure chamber Pz. The tank passages 605, 615 communicate with the tank port T. The pilot passage (not illustrated) communicates with the common passage 710. The signal passage 608 communicates with the outlet (branch passage 181) of the last shuttle valve 300.

The main pump P is connected to the pump passage 604 of the unload relief valve 600. A pilot pump Pi is connected to the pilot pump passage. The tank passages 605, 615 are connected to the tank. The relief valve 700 is, as shown in FIG. 1, connected to a pilot line 19 led from the pilot pump Pi, whereby a pilot pump pressure Pi is kept constant. The pilot line 1 is further connected to an inlet side of each 3-port 2-position switching system electromagnetic proportional pressure control valve 800 provided for every actuator. An outlet side of each electromagnetic proportional pressure control valve 800 is connected to the port C of the pressure compensation valve 200 described earlier. With this arrangement, the external control pressure Pc acts via the fourth oil chamber Y4 on the second pressure receiving surface on the closing side.

A control unit 805 for individually transmitting a control signal (electric current) is connected to an electromagnetic module for moving the spool of each electromagnetic proportional pressure control valve 800 while resisting the spring. The control unit 805 is connected to a signal fetching port of the differential pressure detector 810. The differential pressure detector 810 is, as explained before, interposed between the discharge passage of the main pump P and the maximum load pressure transmitting passage led from the last shuttle valve 300. The detector 810 detects a differential pressure (P−PI) between the main pump discharge pressure P and the maximum load pressure PI. A magnitude of this differential pressure is converted into a voltage value and the outputted. Based on the voltage value given from the differential pressure detector, the control unit 805 calculates a control value. More specifically, according as output from the differential pressure detector 810 becomes larger (when a value obtained by P−PI becomes larger), a smaller signal current value is transmitted to the electromagnetic proportional pressure control valve 800. According as the differential pressure becomes smaller, a larger signal current value is transmitted to the electromagnetic proportional pressure control valve 800.

Transmitted from the electromagnetic proportional pressure control valve 800 to the second pressure receiving surface on the closing side is an external control pressure Pc given such as $$Pc = Pi - \frac{1}{K}(P - Pl).$$

In the pressure compensation valve 200, the control is performed so that a differential pressure between the pilot pump pressure Pi and the external control pressure Pc is proportional to a differential pressure between the main pump pressure P and the maximum load pressure PI.

Note that the control unit 805 incorporates a function capable of individually setting the output to each electromagnetic proportional pressure control valve 800. Namely, the output to a certain electromagnetic proportional pressure control valve 800 is increased or decreased. A pressure Pi of the second oil chamber Y2 and a differential pressure of the fourth oil chamber Y4 are increased or decreased. An opening of the support hole 67 is thus adjusted, and the function of the pressure compensation valve 200 is thereby changed to attain complex operations. Besides, the output to a certain electromagnetic proportional pressure control valve 800 is, if necessary in particular, set to zero (the external control pressure Pc is set to zero). The pressure Pi of the second oil chamber Y2 and the differential pressure of the fourth oil chamber Y4 are set to the maxima. The choke 67 is full opened, thereby releasing the function of pressure compensation valve 200.

Next, the operation of the hydraulic control valve system will be described.

The pressure oil discharged from the main pump P enters the pump passage 604 of the unload relief valve 600. When each of the direction switching valve 100 is in the neutral position, as illustrated in FIG. 3, the load sensing chamber 20 communicates with the tank ports T, T through the right and left communicating passages 32A, 32B. Hence, the pressure of the load sensing chamber 20 of all the control valves is low, and the pressure selected by the shuttle valve 300 is also low. For this reason, the maximum load pressure PI inputted to the signal passage 608 of the unload relief valve 600 is low, and hence the load pressure chamber 610 is thereby kept under a low pressure. Therefore, the pump pressure P of the pilot chamber 607 works to move the unload valve 602 to the left hand in FIG. 2, resisting the spring 611. In consequence, the pump passage 604 communicates with the tank passage 605, whereby the discharge oil of the main pump is returned to the tank.

It is assumed in this state that the spool 4 of the direction switching valve 100 of any one of the control valve M is moved from the neutral position. The load pressure is introduced from the actuator via a communicating passage 32A or 32B into the load sensing chamber 20. This pressure enters the load pressure chamber of the unload valve via the shuttle valve and the signal passage 608 as well. The unload valve disc 602 is thereby, as illustrated in FIG. 2, moved right to close the unload valve 600A.

When the maximum load pressure PI selected by the shuttle valve 300 and led into the load pressure chamber 610 reaches a given pressure set by the adjusting screw 618, the relief valve disc 617 moves left resisting the spring force of the spring 619. A pressure of the load pressure chamber 610 is thereby lowered, resulting in generation of a differential pressure in the unload valve disc 602. This valve disc is moved left, and the pressure oil of the pump passage 604 escapes to the tank passage 605.

Now, moving the spool 4 of the direction switching valve 100 incorporated into the control valve M, the pressure oil supplied from the common passage 700 to the pump pressure chamber Pz flows from the pressure compensation valve 200 via the direction switching valve 100 to the actuator S.

Namely, when moving the spool 4 rightwards, the pressure oil of the pump pressure chamber Pz comes into the upper bore 60 via the through-hole 65 of the balance piston 6. The pressure oil works to open the load check valve 8, resisting the spring 80, and flows into the supply ports PA, PB from the contraction annular groove 22 after passing though the supply hole 67. The pressure oil, after a flow rate thereof is controlled by the choke 31 of the spool 4, passes through the actuator port A and is supplied to an actuator, e.g., cylinder head side Sh. At the same moment, the oil on an actuator rod side Sr is returned from the actuator port B via the choke 31 and the tank port T to the tank. When moving the spool 4 leftwards, the pressure oil comes to the actuator rod side on such a route that supply port PB→choke 31→actuator port B. The oil on the head side is returned to the tank on a route such as actuator port A→choke 31→ tank port T.

On the other hand, the pilot pump Pi is driven simultaneously with the main pump. The pilot pressure Pi controlled to a constant pressure by the relief valve 700 comes to the valve body 1 via the passage 19 and further to the second oil chamber Y2 via the common passage 710. The stepped portion 68 defined as the second pressure receiving surface on the opening side is thereby pressed. The pilot pressure Pi is branched off from the passage 1 and transferred to the inlet side of each electromagnetic proportional pressure control valve 800.

As stated above, when the spool 4 moves right, the small hole 35*b* of the right communicating passage 32B is shut by an inner wall of the lateral bore 2. The small hole 34*a* of the left communicating passage 32A communicates with the actuator port A. Whereas the spool 4 moves left, the small hole 34*b* of the right communicating passage 32B communicates with the actuator port B. As a result, a load pressure Pa is introduced from the actuator into the load sensing chamber 20. The load pressure Pa of the load sensing chamber 20 acts as an opening-side force on the pressure compensation valve 20 through the first oil chamber Y1. At the same moment, the load pressure Pa flows into the shuttle valve 300 via the first inlet hole 302*a*.

The balance piston 6 is raised by the opening-side pressures of the first and second oil chambers Y1, Y2. The pump discharge oil passes through the supply hole 67 and flows via the contraction annular groove 22 to the supply ports PA, PB. The pressure (bridge pressure) Pz enters the back pressure chamber 81 of the load check valve 400 from the small hole 66 in the radial direction. This pressure passes through a filter of the axial bore 140, and its flow rate is controlled by a contraction hole 143. The pressure then runs via the lateral hole 141 into the third oil chamber Y3. The pressure acts on the intermediate flange 70 and works as a closing-side pressure of the balance piston 6.

The load pressure is introduced via the second inlet hole into the above-described shuttle valve 300 from other shuttle valve 300 adjacent thereto. The ball valve moves depending on a magnitude of this pressure. The higher load pressure reaches the next shuttle valve 300 after passing through the passages 16, 15. The maximum load pressure Pi is taken out of the last shuttle valve and then transferred to the differential pressure detector 810. The maximum load pressure PI is at the same time sent as a closing-side pilot pressure to the unload relief valve 600.

The discharge pressure of the main pump P is compared with the maximum load pressure PI in the differential pressure detector 810. A voltage corresponding to this differential pressure is transferred to the control unit 805, wherein the control current is computed. Then works the electromagnetic proportional pressure control valve 800. An external control pressure Pc is produced. This external control pressure Pc is given such as $$Pc = Pi - \frac{1}{K}(P - PI).$$

Namely, the external control pressure Pc is defined as a pressure set corresponding to a pressure difference between the maximum load pressure PI and the pump pressure P. This external control pressure Pc is led via the port C of the cap assembly 9 into the fourth oil chamber Y4. The external control pressure Pc acts on the upper end surface of the head 71 and therefore works as a closing-side pressure of the balance piston 6.

In the pressure compensation valve 200, when the balance piston 6 shifts upwards, there is opened a contraction mechanism based on a combination of the contraction annular groove 22 and the supply hole 67. When the balance piston 6 shifts downwards, the contraction mechanism is closed. The load pressure Pa of the actuator S is introduced into the first oil chamber Y1, while the pilot pump pressure Pi is introduced into the second oil chamber Y2. A resultant force thereof acts to open the choke. On the other hand, the bridge pressure Pz is led into the third oil chamber Y3. The external control pressure Pc is led into the fourth oil chamber Y4. A result force thereof acts to close the choke. With an equilibrium between the resultant force of two forces acting in the opening direction and the resultant force of two forces acting in the closing direction, the throttle opening of the pressure compensation valve 200 can be controlled.

To give a description in greater detail, when the opening of the choke 31 corresponding to one actuator port A or B increases with a shift of the spool 4 of the direction switching valve 100, the load pressure Pa augments. Therefore, the throttle opening of the pressure compensation valve 200 increases. A flow rate in the choke 31 correspondingly increases, and a quantity of oil supplied to the actuators grows. Whereas the opening of the choke 31 of the direction switching valve 100 is reduced, the throttle opening of the pressure compensation valve 200 decreases. The quantity of oil supplied to the actuators is also reduced. It is therefore possible to control the quantity of oil supplied to the actuators, i.e., a driving velocity of the actuators in accordance with a manipulated variable of the direction switching valve 100.

When the load pressure Pa increased with a rise in the load of the corresponding actuator, the throttle opening of the pressure compensation valve 200 increases to boost the bridge pressure Pz. In the reverse case, the throttle opening is diminished to reduce the bridge pressure Pz. Hence, it is feasible to maintain the oil supply quantity per unit time to the actuator in accordance with the manipulated variable of the direction switching valve 100 irrespective of fluctuations in load of the actuator.

According to this invention, the arrangement is not that the maximum load pressure is directly introduced as a closing-side pressure of the balance piston 6 but that the control pressure difference of the pressure compensation valve 200 is set corresponding to a pressure difference between the external control pressure Pc and the pilot pump pressure Pi. Namely, $Pz-Pa=K(Pi-Pc)$, where K is given by the second oil chamber effective pressure receiving area/the first oil chamber effective pressure receiving area. The external control pressure Pc is herein given such as $$Pi - \frac{1}{K}(P - PI),$$

so that $Pz-Pa=P-PI$.

That is, each pressure compensation valve 200 effects the control so that a difference between the bridge pressure Pz and the load pressure Pa comes to the pump pressure P and the maximum load pressure PI. For this purpose, a total oil quantity per unit time which is required by the actuator goes under a discharge capability of the main pump P. Besides, when the maximum load pressure PI is lower than the relief pressure of the relief valve 600B, the control is performed so that the pump pressure P becomes higher than the maximum load pressure PI by a pressure ΔP corresponding to a resilient force of the spring 611. Namely, $Pz-Pa=\Delta P$. More specifically, in the pressure control valve 200 corresponding to the actuator, the control is carried out so that the pressure difference between the load pressure Pa and the bridge pressure Pz becomes a constant value ΔP. As a result, the oil supply quantity per unit time to the actuator is kept to a quantity corresponding to the opening of the choke 31 of the direction switching valve 100.

On the other hand, the total oil quantity per unit time which is demanded by the actuator goes above the discharge capability of the main pump P. The pressure P of the main pump P is lowered. At this time, the unload valve 600A is closed. The difference between the pump pressure P and the maximum load pressure Pi is smaller than ΔP. In consequence, the pressure difference (Pz−Pa) in all the pressure compensation valves 200 is smaller than ΔP. Hence, the oil supply quantity per unit time to all the actuators in the driving state is also decreased, with the result that the driving velocity of the actuator slows down at the same rate. For this reason, the total oil quantity demanded by the actuators in the driving state is regulated. The functions of all the pressure compensation valves 200 are secured. The actuators under a low load condition and under a heavy load condition undergo well-balanced control in terms of operation.

If any one of the actuators encounters the heavy load, and when the maximum load pressure PI exceeds the relief pressure of the relief valve 600B, the pump pressure controlled by the unload valve 600A does not follow up the maximum load pressure, resulting in no fluctuation. Namely, the pump pressure is kept at the maximum pump pressure Pmax. The control pressure Pc at this moment is given by $$Pc = Pi - \frac{1}{K}(Pmax - PI).$$

Therefore, Pz−pa=Pmax−PI. A value obtained by Pmax−Pi is smaller than the constant value ΔP. This value becomes smaller with the greater maximum load pressure PI. Hence, in this case also, the pressure difference (Pz−Pa) in the pressure compensation valve 200 is reduced, and the oil supply quantity per unit time to the actuator is also decreased.

At this time, in the pressure compensation valve corresponding to the actuator where the maximum load pressure PI is developed, there exists a relation such as PI=Pa. Hence, Pa−PI=P−PI in this pressure compensation valve. In this formula, the bridge pressure Pz is invariably smaller than the pump pressure P. For this reason, in the pressure compensation valve corresponding to the actuator where the maximum load pressure PI is developed, the choke is, as in the case of other pressure compensation valves, not full opened. The choke function can be always maintained. As discussed above, as the external control pressure Pc becomes larger—i.e., the differential pressure (P−PI) between the main pump discharge pressure P and the maximum load pressure PI becomes smaller, the flow rate of the circuit as a whole is diminished. Hence, when simultaneously driving the plurality of actuators, the total oil quantity demanded by the actuator is regulated corresponding to a magnitude of value given by P−PI. A lack of the pump discharge oil quantity is relieved. The control is therefore effected so that the actuators both with the light load and with the heavy load are operated in the well-balanced state. Introduced into the fourth oil chamber Y4 is the external control pressure Pc generated by performing the computation with a value of P−PI being used as an electric quantity, however, this pressure acts on the second pressure receiving surface (upper end surface of the plug head 71) on the closing side. The balance piston 6 is thereby pressed, whereby the balance piston 6 is abruptly lowered. On the other hand, the first oil chamber Y1 on the opening side directly undergoes the fluctuations in the load pressure. For this reason, when the choke of the pressure compensation valve 200 is slightly opened, there exists a danger in which hunting will take place.

According to the present invention, however, the balance piston of the pressure compensation valve 200 incorporates a throttle check valve 11. Hunting is thereby effectively prevented owing to descent resistance action by the throttle check valve 11.

To be specific, the load pressure Pa flows via the passage bore structure of the spool 4 into the load sensing chamber 20. The load pressure Pa then flows via the contraction hole 113 formed in the protruded member 112 into the cylindrical portion internal chamber 115 and acts on the bottom of the cylindrical bore 61. Alternatively, the load pressure Pa passes through a gap between the outer periphery of the protruded member 112 and the through-hole 13 and presses up the seal wall 111. The load pressure Pa flowing into the cylindrical portion internal chamber 115 goes through the through-hole 114 to the outer periphery of the cylindrical portion 110. The load pressure Pa then runs through the notch 69 at the annular lower end portion of the balance piston 6, thereby pressing the outside surface thereof. As a result, the balance piston is shifted upwards with a predetermined pressure receiving area.

On the other hand, as stated earlier, when pressing the balance piston 6 on the closing side, the oil within the first oil chamber Y1 flows at the early stage into the load sensing chamber 20 via the contraction hole 113 of the protruded portion 112. At the same time, the oil passes through a gap between the seal wall 111 and the impingement wall 12 and then flows into the load sensing chamber 20 through the gap between the outer periphery of the protruded portion 112 and the through-hole 13. The seal wall 111 is, however, immediately seated with the surface of the impingement wall 12 by the spring force of the spring 17. Consequently, an outflow from the route between the seal wall 111 and the impingement wall 12 is stopped. Thereafter, the oil flows out with a small quantity regulated by the contraction hole 113. In this way, the load pressure Pa is allowed to freely flow on the opening side of the balance piston 6. Whereas on the closing side of the balance piston 6, the flow rate is contraction-controlled. The oil within the first oil chamber Y1 exhibits braking action, thereby restraining a sharp drop of the balance piston 6. The control can be effected with a stable minute opening.

Note that the protruded portion 112 protrudes from the through-hole 13 of the impingement wall 12, and, with this arrangement, the throttle check valve 11 and the balance piston 6 can easily be fabricated.

Although the illustrative embodiments of the present invention have been described in detail with reference to the accompanying drawings, it is to be understood that the present invention is not limited to those embodiments. Various changes or modifications may be effected therein by one skilled in the art without departing from the scope or spirit of the invention.

What is claimed is:

1. A control system comprising a valve system disposed between a single hydraulic main pump P and a plurality of actuators driven by said hydraulic main pump P, comprising:

i) a plurality of control valves M set into valve bodies 1 each incorporating a shuttle valve 300 for selecting a higher pressure from load pressures of said actuators S and a pressure compensation valve 200 having a function to shunt a discharge oil of said main pump as well as a direction switching valve 100 having a spool 4;

ii) an unload relief vavle 600 provided in a main pump discharge passage disposed more upstream than said pressure compensation valve 200, said unload relief valve 600 working on the closing side by a maximum load pressure detected by said shuttle valve 300;

iii) a pilot pump Pi for supplying a pilot pressure to said pressure compensation valve 200;

iv) a detector 810 for detecting a differential pressure between said maximum load pressure Pi detected by said shuttle valve and a main pump discharge pressure P;

v) a plurality of electromagnetic proportional pressure control valves 800 for generating an external control pressure Pc acting on the closing side of each of said pressure compensation valves 200; and vi) a control until 805 for operating said electromagnetic proportional pressure control valve 800 in accordance with a magnitude of said differential pressure detected by said detector 810, characterized in that vii) each of said valve bodies 1 is formed with a lateral bore 2 in which said spool 4 of said direction switching valve 100 is slid and a vertical bore 3 orthogonal thereto, said vertical bore having a higher-than-spool 4 vertical sub-bore in which pressure compensation valve is slidably accommodated and a lower-than-spool 4 vertical sub-bore in which said said shuttle valve 300 is accommodated, viii) an intersection between said vertical bore 3 and said lateral bore 2 is formed with a load sensing chamber 20, for introducing a load pressure Pa of said actuator, to which a first pressure receiving surface on the opening side of said pressure compensation valve 200 and an inlet of said shuttle valve 300 face, said pressure compensation valve 200 having an opening-side second pressure receiving surface contacting a pilot pressure Pi given from said pilot pump Pi in the vicinity of said opening-side first pressure receiving surface, said pressure compensation valve 200 further having a closing-side first pressure receiving surface on which a bridge pressure Pz acts and a closing-side second pressure receiving surface on which an external control pressure Pc from said electromagnetic proportional pressure control valve 800 acts; and ix) said pressure compensation valve 200 incorporates a throttle check valve 11 working as a descent resistance when receiving a closing-side pressure in a region of said opening-side first pressure receiving surface.

2. The control system as set forth in claim 1, wherein said pressure compensation valve 200 includes a cylindrical balance piston 6 having its lower end which impinges on an impingement wall 12 for partitioning said load sensing chamber 20 forms a first oil chamber Y1 provided thereabove, said impingement wall 12 being formed with a through-hole 13 communicating with said load sensing chamber 20, and said balance piston 6 is formed with a cylindrical bore 61 from the lower end as said opening-side first pressure receiving surface, said cylindrical bore 61 incorporating said throttle check valve 11.

3. The control system as set forth in claim 2, wherein said throttle valve 11 assumes a cup-like configuration, and a part of said valve 11 extends up to said load sensing chamber 20, said throttle check valve 11 having a contraction hole 113 through which said load sensing chamber 20 communicates with said cylindrical bore 61.

4. The control system as set forth in claim 2, wherein said throttle check valve 11 includes a cylindrical portion 110 loosely fitted enough to form a gap between said cylindrical bore 61 and said cylindrical portion itself, a seat wall 111 seated with said impingement wall 12 by a spring 117 supported on the bottom of said cylindrical bore 61 at the bottom of said cylindrical portion 110 and a protruded portion 112 loosely penetrating said through-hole 13 from said seat wall 111, reaching said load sensing chamber 20 and formed with a contraction hole 113 through which said load sensing chamber 20 communicates with a cylindrical portion internal chamber 115, wherein said cylindrical portion 110 is formed with a plurality of through-holes 114 communicating with said cylindrical bore 61, and wherein a plurality of notches 69 communicating with a first oil chamber Y1 for introducing the load pressure from said load sensing chamber 20.

5. The control system as set forth in claim 2, wherein said vertical bore 3 is formed with a first annular oil chamber Y1 which is vertically higher than said load sensing chamber 20 and into which said pressure Pa is introduced, a second annular oil chamber Y2 which is vertically higher than said first oil chamber Y1 and into which said pilot pump pressure is introduced, and an annular pump pressure chamber which is vertically higher than said second oil chamber Y2 and into which said pump pressure is introduced, and an outer surface of said balance piston 6 includes a stepped portion 68 which is positioned in said second oil chamber Y2.

6. The control system as set forth in claim 1, wherein said pressure compensation valve 200 includes a cylindrical balance piston 6 having its upper portion to which a plug 7 is fixed and its interior incorporating a load check valve 8, wherein said balance piston 6 has a middle land portion 63 formed with a supply hole 67 for introducing an inflow pump pressure oil into supply ports PA, PB by opening said load check valve 8, said supply ports PA, PB having their connecting portion formed with a contraction annular groove 22 in said vertical bore so as to control an oil quantity in cooperation with said supply hole 67 when said balance piston 6 shifts upwards, and wherein said plug 7 includes an intermediate flange 70 contacting the upper end of said balance piston 6 and a head 71 extending upwards from said intermediate flange 70 serving as a closing-side first pressure receiving surface, said head 71 having its upper end surface serving as a closing-side second pressure receiving surface.

7. The control system as set forth in claim 6, wherein a spring seat plug 14 for a spring for biasing said load check valve 8 in the closing direction is screwed into said plug 7 and has an axial bore 140 communicating with a back pressure chamber 81 of said load check valve 8, said axial bore 140 communicating via a lateral hole 141 having a contraction hole 143 with a third oil chamber Y3 in which said intermediate flange 70 is positioned, said back pressure chamber 81 constantly communicating with said supply ports PA, PB via a small hole 66 formed in said balance piston 6.

8. The control system as set forth in claim 7, wherein a filter 142 is fitted in said axial bore 140.

9. The control system as set forth in claim 7, wherein said third oil chamber Y3 is shaped in a region defined by the lower end of a boss 90 into which said head 71 is slidably fitted, said vertical bore and said intermediate flange 70.

10. The control system as set forth in claim 1, wherein said spool 4 includes an internal passage for leading said load pressure from said actuator ports A, B to said load sensing chamber 20.

11. The control system as set forth in claim 10, wherein said internal passage includes communicating passages 32A, 32B each being a blind bore bored in the axial direction from the right and left ends of said spool, and said communicating passages 32A, 32B have small-holes 34*a*, 34*b* formed in positions close to reduced diameter portions of said spool 4 as well as small holes 35*a*, 35*b* in positions corresponding to said load sensing chamber 20.

* * * * *